Figure 1:
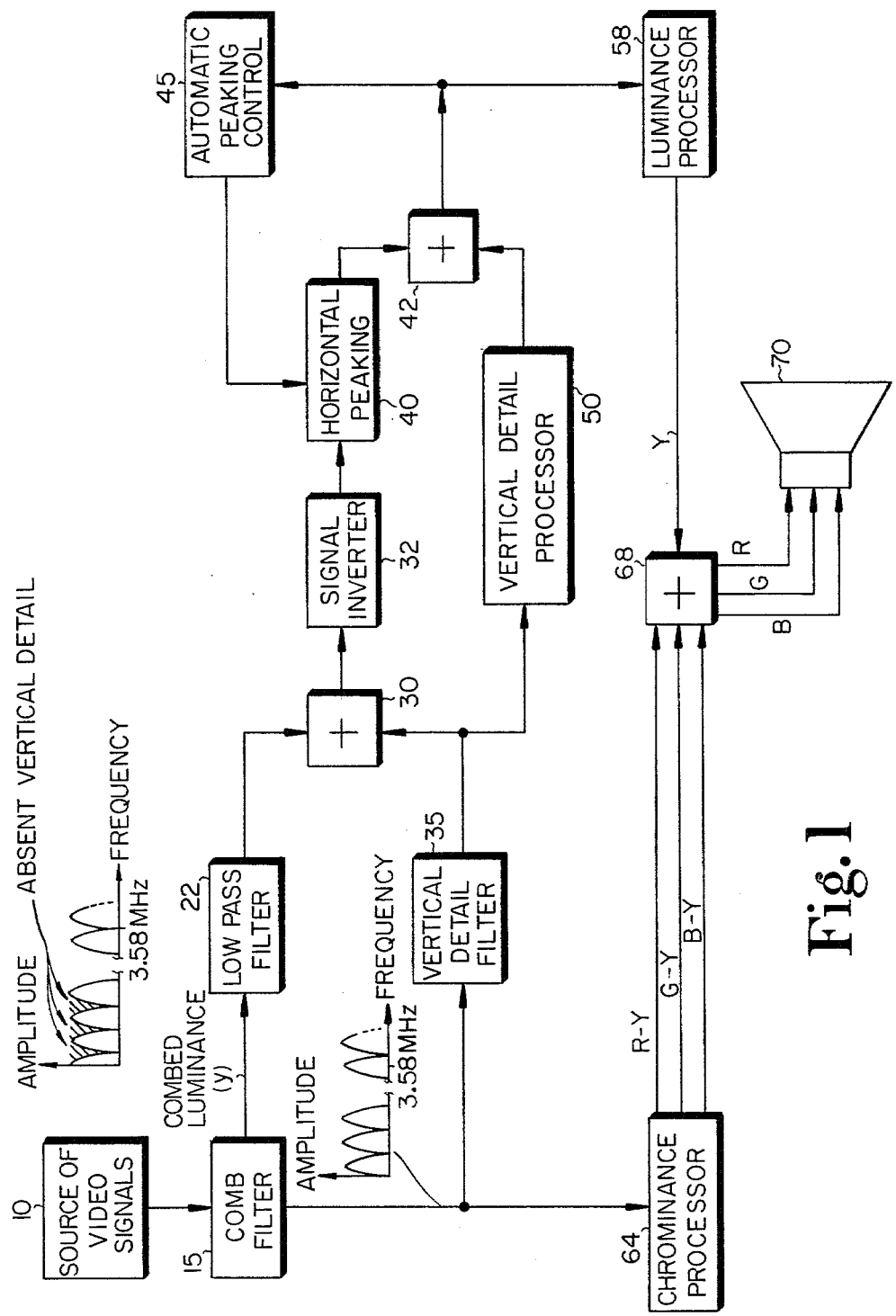

United States Patent [19]

Harlan

[11] 4,351,003
[45] Sep. 21, 1982

[54] AUTOMATIC VIDEO SIGNAL PEAKING CONTROL

[75] Inventor: Wayne E. Harlan, Indianapolis, Ind.

[73] Assignee: RCA Corporation, New York, N.Y.

[21] Appl. No.: 255,609

[22] Filed: Apr. 20, 1981

[51] Int. Cl.³ ............................................. H04N 5/14
[52] U.S. Cl. ................................................. 358/166
[58] Field of Search ................ 358/37, 166, 162, 160, 358/184

[56] References Cited

U.S. PATENT DOCUMENTS

| | | | |
|---|---|---|---|
| 3,800,077 | 3/1974 | Smith | 358/166 |
| 3,919,714 | 11/1975 | Bingham | 358/38 |
| 3,984,631 | 10/1976 | Avicola | 178/7.3 R |
| 4,075,661 | 2/1978 | Heffron | 358/166 |
| 4,080,627 | 3/1978 | Wheeler | 358/162 |
| 4,081,836 | 3/1978 | Skinner | 358/166 |

Primary Examiner—Robert L. Richardson
Attorney, Agent, or Firm—Eugene M. Whitacre; William H. Meagher; Ronald H. Kurdyla

[57] ABSTRACT

A circuit for automatically controlling the high frequency peaking content of an image representative video signal processed in the luminance signal path of a television receiver is disclosed. The luminance path also includes a linear phase network for generating a peaking signal which is added to the video signal for accentuating high frequency video signal components. The control circuit forms a closed feedback loop with the peaking network. The control circuit develops a control voltage in response to the high frequency content of the video signal, including peaking components already present in the video signal and as imparted from the peaking network. The control voltage controls the level of the locally generated peaking component to maintain the overall peaking content of the video signal within desired limits. A viewer adjustable peaking preference control is included in the feedback loop to tailor the response of the automatic peaking control network with respect to a desired level of signal peaking in accordance with the setting of the preference control.

17 Claims, 2 Drawing Figures

AUTOMATIC VIDEO SIGNAL PEAKING CONTROL

This invention concerns a system for automatically controlling the amount of peaking present in a video signal processed by a television receiver, for example.

A reproduced image developed in response to video signals processed by a television receiver can be subjectively improved or enhanced by increasing the slope or "steepness" of video signal amplitude transitions. Such enhancement, commonly referred to as signal "peaking", is typically associated wth the high frequency information of the video signal and can be accomplished with respect to both vertical and horizontal image detail information. For example, horizontal peaking can be achieved by generating a signal "preshoot" just before an amplitude transition, and a signal "overshoot" just after an amplitude transition, so that black-to-white and white-to-black transitions are accentuated.

The amount of peaking manifested by a video signal processed by a television receiver can be attributed to a variety of sources. Both horizontal and vertical peaking can be provided at the broadcast transmitter and by circuits within the television receiver in fixed or controllable amounts. Signal peaking or depeaking can also result from a signal "mismatch" in a cable video signal distribution path. Since signal peaking accentuates the high frequency response of a video signal, the presence of high frequency noise is also a consideration in determining the amount of peaking to be imparted to a video signal. For example, it is considered preferable to reduce the amount of peaking in the presence of a weak video signal which is likely to comprise a relatively large amount of noise compared to a strong video signal. Excessive peaking in the presence of a weak, noisy signal undesirably serves to accentuate the high frequency noise component to the detriment of reproduced picture quality.

Accordingly, it is herein recognized as desirable to automatically control the amount of video signal peaking as a function of the high frequency content of a video signal including peaking components imparted from several sources, to optimize the amount of video signal peaking consistent with an objective of providing a reproduced image with good image detail under various signal conditions.

It is often desirable, in a television receiver system, to provide the viewer with a means of manually controlling the peaking content of the video signal and displayed picture in accordance with his preferences. Accordingly, it is recognized that in a system of this type the automatic peaking control function should operate to maintain a peaking level consistent with the viewer's preference as determined by the setting of the peaking preference control.

Apparatus according to the present invention is included in a system for processing video signals with image representative luminance and chrominance components, and serves to automatically control the high frequency peaking content of the luminance signal. The apparatus includes a signal peaker responsive to the luminance signal for generating a peaking signal component, which is combined with the luminance signal to produce a peaked luminance signal with accentuated high frequency components. A sensing network responsive to the peaked luminance signal develops a control signal in accordance with the magnitude of high frequency components of the peaked luminance signal. A control network coupled to the signal peaker and responsive to the control signal controls the magnitude of the peaking component and thereby the magnitude of accentuated high frequency luminance components in accordance with the level of the control signal.

In accordance with a feature of the invention, the control network includes a controllable conduction device, and an adjustable peaking control for controlling the conduction level of the controllable conduction device.

In accordance with another feature of the invention, the automatic peaking control apparatus is included in a color television receiver employing a comb filter to separate the luminance and chrominance components of the television signal. Combed luminance signals appear at a first comb filter output. A second comb filter output includes signal frequencies representative of vertical image detail information absent from the combed luminance signal at the first comb filter output. A restored luminance signal is developed by combining the combed luminance signal with a vertical detail signal component derived from the second comb filter output, and the restored luminance signal is subjected to horizontal peaking by means of the signal peaker. A vertical detail peaking component is developed by a vertical peaking network responsive to the derived vertical detail component, and is combined with the horizontally peaked luminance signal to produce a horizontally and vertically peaked output luminance signal. The sensing network responds to the high frequency content of this output luminance signal for developing a proportional control voltage which is used to control the magnitude of the horizontal peaking component.

Figure 2:
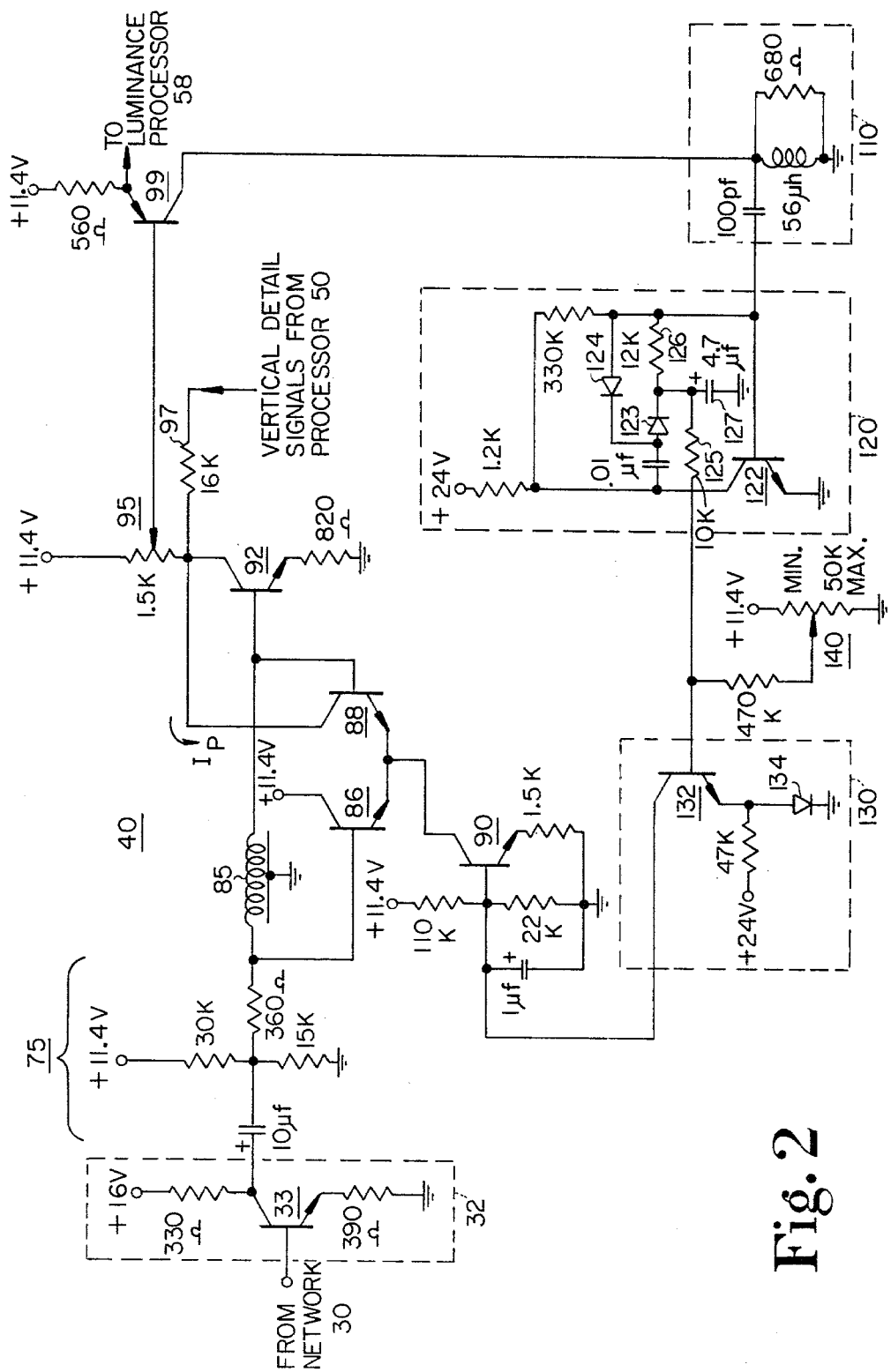

In the drawing:

FIG. 1 shows a block diagram of a portion of a color television receiver including an automatic peaking control network according to the present invention; and FIG. 2 shows additional details of a portion of the system of FIG. 1, including the automatic peaking control network.

In FIG. 1, a source 10 of composite color television signals including luminance and chrominance components supplies video signals to an input of a comb filter 15 of known configuration, such as a comb filter employing charge coupled devices (CCD's) as shown in U.S. Pat. No. 4,096,516. The luminance and chrominance components are arranged within the video signal frequency spectrum in frequency interleaved relation. The luminance component has a relatively wide bandwidth (extending from D.C. or zero frequency to about four megahertz). The upper frequency range of the luminance component is shared with the chrominance component, which comprises a subcarrier signal of 3.58 MHz. amplitude and phase modulated with color information. The amplitude versus frequency response of comb filter 15 with respect to luminance combing action exhibits a peak amplitude response at integral multiples of the horizontal line scanning frequency (approximately 15,734 Hz.) extending from D.C. or zero frequency, and an amplitude null at odd multiples of one-half the line scanning frequency, including the 3.58 MHz. chrominance subcarrier frequency. The amplitude versus frequency response of comb filter 15 with respect to chrominance combing action exhibits a peak amplitude response at odd multiples of one-half the line frequency including 3.58 MHz., and an amplitude null at integral multiples of the line frequency.

A "combed" luminance signal (Y) from a first output of comb filter 15 is coupled via a low pass filter 22 to an input of signal combining network 30. Filter 22 is arranged to pass all luminance signals below a cut-off frequency of approximately 4 MHz., and serves to remove noise and clock frequency components of switching signals associated with the switching operation of comb filter 15 when of a CCD type.

A second output of comb filter 15 is applied to a chrominance signal processing unit 64 for generating R-Y, B-Y and G-Y color difference signals, and is also applied to an input of a low pass vertical detail filter 35. Unit 64 includes a suitable input filter for passing only those signal frequencies from comb filter 15 which occupy the band of chrominance signal frequencies. Filter 35 exhibits a cut-off frequency of approximately 1.5 MHz., and selectively passes those signal frequencies present in the second signal output of comb filter 15 which lie below this cut-off frequency. Signal frequencies in this region represent vertical detail luminance information which is absent from the combed luminance signal and which must be restored to the luminance signal to avoid loss of vertical resolution in the luminance content of a displayed image. Such vertical detail restoration is accomplished by combining an appropriate linear amount of the vertical detail signal from filter 35 (which exhibits a linear amplitude transfer response), with the filtered combed luminance signal from filter 22, in combining network 30. The restored luminance signal from the output of combiner 30 is inverted by unit 32, subjected to horizontal detail processing by means of a horizontal peaking network 40, and afterwards applied to an input of a signal combining network 42.

Vertical detail signals from filter 35 also are supplied to a non-linear vertical detail signal processing circuit 50, for imparting different amount of signal gain to vertical detail signals within predetermined ranges of signal amplitude. Specifically, moderate amplitude vertical detail signals are peaked or enhanced, and large amplitude vertical detail signals are pared or attenuated. Processed signals from network 50 are supplied to another input of combiner 42, where they are summed with the signals from horizontal peaker 40. Additional information concerning the arrangement of horizontal processor 40 with vertical processor 50 is found in a copending, concurrently filed U.S. patent application of W. A. Lagoni titled "Horizontal and Vertical Image Detail Processing of a Color Television Signal". A network 45 responsive to output signals from combiner 42 serves to automatically control the magnitude of peaking signals developed by network 40.

The output signal from combiner 42 corresponds to a reconstituted luminance component of the color television signal with the horizontal detail information peaked as will be discussed, and with the vertical detail information thereof restored, enhanced (peaked) and pared (attenuated) as discussed in the aforementioned U.S. patent application of W. A. Lagoni. The reconstituted luminance component is afterwards applied to a luminance signal processing unit 58. An amplified luminance signal Y from unit 58 and the color difference signals from chrominance unit 64 are combined in a matrix 68 for providing R, B and G color image representative output signals. These signals are then suitably coupled to image intensity control electrodes of a color kinescope 70.

FIG. 2 shows circuit details of horizontal peaking network 40 and automatic peaking control 45 of FIG. 1, as follows.

Restored combed luminance signals are applied from the output of network 30 to the input of horizontal peaking network 40 via signal inverter 32 comprising a transistor 33, and an input signal translating network 75. Peaking network 40 includes a delay line 85 coupled between the inputs of a differential amplifier comprising transistors 86 and 88. Operating currents for amplifier 86, 88 are provided from a DC current source including a transistor 90. Peaking network 40 also includes an output transistor 92 coupled to an output of delay line 85.

The luminance signal is applied via input network 75 to a first input of the differential amplifier at the base of transistor 86. A delayed luminance signal is applied via delay line 85 to a second input of the differential amplifier at the base of transistor 88. The output terminal of delay line 85 which is coupled to the high input impedance base electrodes of transistors 88 and 92 is substantially unterminated so that the delay line operates in a reflective mode, whereby a reflected and twice delayed luminance signal is developed at the base input of transistor 86. The delayed and twice delayed (reflected) signals cause the differential amplifier to develop preshoot and overshoot peaking signal components in the collector circuit of transistor 88. The preshoot and overshoot peaking components are combined with the delayed luminance signal in a common load impedance comprising a potentiometer 95 in the collector circuits of transistors 88 and 92 to develop a peaked luminance signal. A more specific description of the peaking circuit follows.

In this example delay line 85 exhibits a substantially linear phase response over the luminance signal bandwidth (zero Hz. to approximately 4.0 MHz.). Delay line 85 provides a signal delay on the order of 140 nanoseconds so that the amplitude-versus-frequency response of network 40 has a peak amplitude response at approximately 3.5 MHz. More specifically, the delay line network response resembles a sine-squared function wherein the signal peaking frequency range encompasses frequencies from 1.75 MHz. to 5.25 MHz. (the −6db points) with a maximum amplitude response at 3.5 MHz. Since the output of delay line 85 is terminated by the high input impedances of transistors 88 and 92, the delay line output is essentially unterminated relative to its characteristic impedance (680 ohms in this example) whereby the delay line operates in a reflective mode with a reflection coefficient of approximately unity. The input of delay line 85 is terminated in its characteristic impedance by means of input network 75.

The peaking component is proportional to a peaking current $I_p$ developed as collector current of transistor 88. This peaking current develops a proportional peaking voltage across signal combining load impedance 95. Accordingly, an output signal developed at the wiper of potentiometer 95 corresponds to a peaked luminance signal with amplitude transitions thereof accentuated by means of a preshoot and an overshoot developed in response to peaking current $I_p$. Output signals from the wiper of potentiometer 95 are supplied to luminance processor 58 via a buffer transistor 99. These output signals include horizontally peaked signals developed as discussed, as well as non-linearly processed (e.g., peaked and pared) vertical detail signals from processor 50 (FIG. 1) which are coupled via a resistor 97 to the combining point at the joined collectors of transistors 88 and 92. Additional information concerning the operation of peaking network 40 is found in my copending U.S. patent application titled "Self-Limiting Video Signal Peaking Circuit".

The magnitude of the peaking component developed by circuit 40 is determined by the magnitude of peaking current $I_p$. The peaking current level can be controlled by controlling the level of conduction of current source transistor 90 as discussed below.

FIG. 2 also illustrates an automatic peaking control network arranged in closed control loop feedback relation with peaking network 40. The peaking control network includes a high-pass filter 110, an amplitude detector 120, and a threshold network 130. A viewer adjustable peaking preference control 140 is coupled to network 130 in the control loop. The peaking control network senses the amount of high frequency information including peaking components present in the video signal which is supplied to luminance processor 58 via the wiper of potentiometer 95 and transistor 99. The control network develops a control signal proportional to the amount of high frequency information detected, for automatically controlling the conduction of current source transistor 90 and thereby controlling the amount of signal peaking developed by network 40. As a result, the amount of peaking imparted to the luminance signal supplied to processor 58 is maintained within desired limits, consistent with the setting of the viewer peaking preference control. The structure and operation of the automatic peaking control network is described in greater detail below.

The luminance signal from the wiper of potentiometer 95 is coupled to high pass filter 110 via the collector of transistor 99. This signal includes high frequency peaking components derived from various sources as discussed. This signal is high-pass filtered by filter 110, and afterwards peak detected by detector 120 including a transistor 122, rectifier diodes 123 and 124, and a peak responding filter capacitor 127.

The detected output signal from detector 120, as developed on capacitor 127, represents the high frequency information content of the luminance signal over a given frequency range. In this example the detection frequency response of the network including filter 110 and detector 120 encompasses a frequency range approximately from 1.6 MHz. to 3.5 MHz. (the −3db points) with a peak amplitude response at approximately 2.0 MHz. This frequency response is attributable in part to the high-pass response of filter 110 which passes signals above 1.6 MHz., and in part to the low-pass frequency response of detector 120 which exhibits a high frequency cut-off (−3db point) of approximately 3.5 MHz. As a practical matter, the typical frequency response of an overall television receiver system and the frequency content of normally experienced luminance signals are such that the described detection frequency response provides a suitable indication of luminance signal high frequency information including peaking components. However, other detection frequency responses are also possible, depending on the requirements of a particular system.

The peak detected high frequency information is coupled via a resistor 125 to a transistor 132 in network 130. A signal developed at the collector of transistor 132 serves to control the bias of current source transistor 90 of peaking network 40. The current conduction of transistor 90, and thereby the magnitude of the peaking component developed by network 40, varies in accordance with the conduction level of transistor 132.

The wiper of peaking preference control 140 is coupled to the base of transistor 132 for controlling the bias of transistor 132 as will be discussed. This control is included in the feedback control loop and can be set to provide controllable amounts of peaking between a minimum level (MIN setting) and a maximum level (MAX setting). Transistor 132 is a high gain device with a current gain of approximately 100, and is biased to conduct relatively low levels of current (e.g., on the order of 100 microamperes) when the base voltage of transistor 132 substantially equals or exceeds a threshold voltage of approximately +1.0 volts. This threshold voltage corresponds to the sum of the offset voltage of a forward biased emitter diode 132 (+0.5 volt) and the base-emitter junction offset voltage (+0.5 volt) of transistor 132. Transistor 132 operates as a controllable conduction device in the closed control loop mode, and as a comparator. In the latter regard, the base voltage of transistor 132 is "compared" to the emitter voltage so that transistor 132 conducts when the base voltage exceeds the emitter voltage by +0.5 volts or more.

The automatic peaking control loop comprises potentiometer 95, transistor 99, filter 110, detector 120, network 130, and transistors 90 and 88 of network 40. Transistor 132 is biased from peaking control 140 so that transistor 132 conducts, and the feedback control path is closed (i.e., operative), for most settings of peaking control 140. Specifically, the control loop will open when transistor 132 is biased "off" in response to a setting of control 140 near the MAX position, when the base bias voltage of transistor 132 as derived from the wiper of control potentiometer 140 falls below the +1.0 volt threshold conduction level.

Assuming for the moment that the high frequency content of the luminance signal is substantially constant, and that control 140 is set at an approximately midrange position corresponding to an amount of peaking desired by a viewer, an equilibrium condition will result with respect to the voltage on detector capacitor 127, the input bias of transistor 132, and the amount of peaking provided by network 40. The closed control loop will act to maintain this desired level of peaking (i.e., consistent with the setting of preference control 140) in the presence of a change in the high frequency content. For example, an increase in the video signal high frequency content will be detected by detector 120 and, in this instance, the voltage on detector capacitor 127 will increase proportionally causing transistor 132 to increase conduction. The increased conduction of transistor 132 reduces the base current drive to current source transistor 90. This in turn decreases the collector current of transistor 90 and thereby the magnitude of the collector peaking current $I_p$ of transistor 88. Accordingly, the high frequency content of the signal developed at the wiper of potentiometer 95 decreases to a level corresponding to a desired level of video signal and picture peaking consistent with the setting of preference control 140. At this time a new equilibrium condition exists (i.e., a new equilibrium voltage on capacitor 127 and a new equilibrium collector current of transistor 132), and remains until the control loop again reacts in response to a change in the video signal high frequency content, or until peaking control 140 is adjusted by the viewer. Observations analogous to the above also apply when the control loop acts to automatically increase the amount of peaking.

The amount of signal peaking can also be varied by adjusting control 140, which then determines a new equilibrium current conduction level of transistor 132. For example, in this case peaking is reduced by adjusting control 140 toward the MIN position. This increases the base bias of transistor 132, causing transistor 132 to increase conduction and causing the magnitude of the peaking component from network 40 to decrease. This change is sensed by detector 120 and causes the voltage on capacitor 120 to decrease proportionally, to a new equilibrium level. Thus control 140 can tailor the response of the control loop to provide automatic peaking control with regard to a desired level of peaking in accordance with the setting of control 140. The threshold conduction level of transistor 132 can be changed by modifying the emitter impedance of transistor 132 (e.g., increasing the emitter circuit impedance of transistor 132 will serve to raise the threshold conduction level of transistor 132). Also, the detector output voltage developed on capacitor 127 can be increased by increasing the value of a resistor 126. This will cause transistor 132 to conduct sooner to close the control loop in the presence of a low level of video signal high frequency components.

In addition to the features mentioned above, it is noted that peaking control by means of controlling the amount of DC current conducted by transistor 90 is advantageous in that such control does not disturb the signal processing parameters of the main signal path including linear phase response delay line 85. In particular, the phase of signals subjected to peaking by network 40 is not affected as the amount of peaking is controlled via the control loop including transistor 90.

Closed loop operation is advantageous in that it renders the circuit performance less dependent on certain circuit parameters such as transistor current gain. In the arrangement of FIG. 2, the feedback control gain of the circuit path between the wiper of potentiometer 95 and the collector output of transistor 95 is advantageously substantially independent of the setting of peaking control 140 during closed loop operation. In this instance changing the setting of control 140 will cause a proportional change in the gain of the peaking network comprising differential amplifier 86, 88, with an associated change in the magnitude of the peaking component output of transistor 88. However, the feedback path gain will change by an insignificant amount, thereby promoting predictable control of the magnitude of the peaking component generated by amplifier 86, 88.

Other versions of the described automatic peaking control arrangements are possible within the scope of the invention.

For example, the lower detection frequency response of detector 120 and filter 110 (1.6 MHz.) can be lowered further (e.g. to 1.5 MHz. and less) to detect the amount of luminance signal peaking attributable to peaked vertical detail information.

Also, detector 120 can be arranged as an average detector rather than as a peak detector as shown. A peak detector is preferred to maintain a desired level of subjective picture sharpness by controllably reducing peaking in the presence of strong, relatively noise-free video signals. In this case picture sharpness is primarily a function of video signal amplitude transitions. An average detector is preferred to controllably reduce signal peaking under weak, noisy signal conditions. These considerations suggest that a receiver may employ both an average and a peak detector in combination with a switching comparator responsive to the outputs of both detectors. The comparator output can be coupled to the control loop to enable the loop to respond to that detector output which is greater. This would permit optimum peaking control for both strong wnd weak (noisy) signal conditions.

What is claimed is:

1. In a video signal processing system including a source of video signals with image representative luminance and chrominance signal components, said system including means for separating said luminance signal component from said video signal; apparatus for automatically controlling the high frequency peaking content of said luminance signal, comprising:
   signal peaking means responsive to said luminance signal for generating a peaking signal component;
   means for combining said peaking component with said luminance signal to produce a peaked luminance signal with accentuated high frequency components;
   means responsive to said peaked luminance signal for developing a control signal in accordance with the magnitude of high frequency components of said peaked luminance signal; and
   means coupled to said peaking means and responsive to said control signal for controlling the magnitude of said peaking component and thereby the magnitude of accentuated high frequency luminance components in accordance with the level of said control signal.

2. Apparatus according to claim 1, wherein said control signal developing means comprises:
   filter means for selectively passing high frequency components of said peaked luminance signal; and
   amplitude detector means for generating said control signal in response to high frequency components selectively passed by said filter means.

3. Apparatus according to claim 2, wherein said detector means comprises a peak amplitude detector.

4. Apparatus according to claim 2, wherein said detector means comprises an average amplitude detector.

5. Apparatus according to claim 2, wherein:
   said controlling means comprises controllable conduction means.

6. Apparatus according to claim 5, and further comprising:
   adjustable peaking control means for controlling the conduction level of said controllable conduction means.

7. Apparatus according to claim 1, wherein
   said means for generating said peaking signal component exhibits a linear phase response with respect to the range of signal frequencies encompassed by said luminance signal.

8. Video signal processing apparatus in a television receiver system for processing a video signal containing image representative luminance and chrominance signal components disposed within a frequency spectrum of said video signal in frequency interleaved relation, said system including comb filter means for providing at a first output a combed luminance signal with amplitude peaks at integral multiples of an image line scanning frequency and amplitude nulls at odd multiples of one-half of said line frequency, and for providing at a second output a combed signal with amplitude peaks at odd multiples of one-half said line frequency and amplitude nulls at integral multiples of said line frequency, and wherein signals provided at said second output include signal frequencies representative of luminance vertical image detail information absent from said combed luminance signal at said first output; means coupled to said second output of said comb filter means for selectively passing said signal frequencies corresponding to vertical detail signal information, to the exclusion of signals occupying the band of chrominance signal frequencies; a luminance signal processing channel; and means for supplying to said luminance channel a restored luminance signal comprising horizontal and vertical detail signal information; said apparatus being arranged for automatically controlling the high frequency peaking content of said luminance signal and comprising:

signal peaking means responsive to said restored luminance signal for generating a peaking signal component;

means for combining said peaking component with said restored luminance signal to produce a peaked luminance signal with accentuated high frequency components;

means responsive to said peaked luminance signal for developing a control signal in accordance with the magnitude of high frequency components of said peaked luminance signal; and means coupled to said peaking means and responsive to said control signal for controlling the magnitude of said peaking component and thereby the magnitude of accentuated high frequency luminance components in accordance with the level of said control signal.

9. Apparatus according to claim 8, wherein said means for developing said control signal comprises:

filter means for selectively passing high frequency components of said peaked luminance signal; and amplitude detector means for generating said control signal in response to high frequency components selectively passed by said filter means.

10. Apparatus according to claim 9, wherein:

said controlling means comprises controllable conduction means.

11. Apparatus according to claim 10, and further comprising:

adjustable peaking control means for controlling the conduction level of said controllable conduction means.

12. Apparatus according to claim 8, wherein said means for generating said peaking signal component exhibits a linear phase response with respect to the range of signal frequencies encompassed by said luminance signal.

13. Video signal processing apparatus in a television receiver system for processing a video signal containing image representative luminance and chrominance components disposed within a frequency spectrum of said video signal in frequency interleaved relation, said system including comb filter means for providing at a first output a combed luminance signal with amplitude peaks at integral multiples of an image line scanning frequency and amplitude nulls at odd multiples of one-half said line frequency, and for providing at a second output a combed signal with amplitude peaks at odd multiples of one-half said line frequency and amplitude nulls at integral multiples of said line frequency, and wherein signals provided at said second output include signal frequencies representative of luminance vertical image detail information absent from said combed luminance signal at said first output, said apparatus comprising:

means coupled to said second output of said comb filter means for selectively passing said signal frequencies corresponding to vertical detail information, exclusive of signal frequencies occupying the band of chrominance signal frequencies, to thereby derive a vertical detail signal component from said second output of said comb filter means;

first means for combining combed luminance signals from said first output of said comb filter means with a given magnitude of said vertical detail component to produce a restored luminance signal;

first signal translating means responsive to said restored luminance signal for peaking horizontal image detail information of said restored luminance signal to provide a horizontally peaked luminance signal at an output, said first translating means including means for generating a horizontal peaking component and means for combining said horizontal peaking component with said restored luminance signal;

second signal translating means responsive to said vertical detail component for developing a vertical detail peaking component at an output;

second means for combining signal outputs from said first and second translating means to produce a horizontally and vertically peaked luminance signal at an output;

luminance signal utilization means for receiving output signals from said second combining means; and means for automatically controlling the high frequency peaking content of luminance signals received by said luminance signal utilization means, comprising:

means responsive to said luminance signals from said second combining means for developing a control signal in accordance with the magnitude of high frequency components of said luminance signal from said second combining means; and means coupled to said first translating means and responsive to said control signal for controlling the magnitude of said horizontal peaking component and thereby controlling the magnitude of accentuated high frequency luminance components in accordance with the level of said control signal.

14. Apparatus according to claim 13, wherein said means for developing said control signal comprises:

filter means for selectively passing high frequency components of peaked luminance signals from said second combining means; and amplitude detector means for generating said control signal in response to high frequency components selectively passed by said filter means.

15. Apparatus according to claim 14, wherein:

said controlling means comprises controllable conduction means.

16. Apparatus according to claim 15, and further comprising:

adjustable peaking control means for controlling the conduction level of said controllable conduction means.

17. Apparatus according to claim 13, wherein:

said means for generating said horizontal peaking component exhibits a linear phase response with respect to the range of signal frequencies encompassed by said luminance signal.

* * * * *